April 13, 1937.  W. S. CLEAVES  2,076,617
WEIGHING MACHINE
Filed July 13, 1934  7 Sheets-Sheet 1
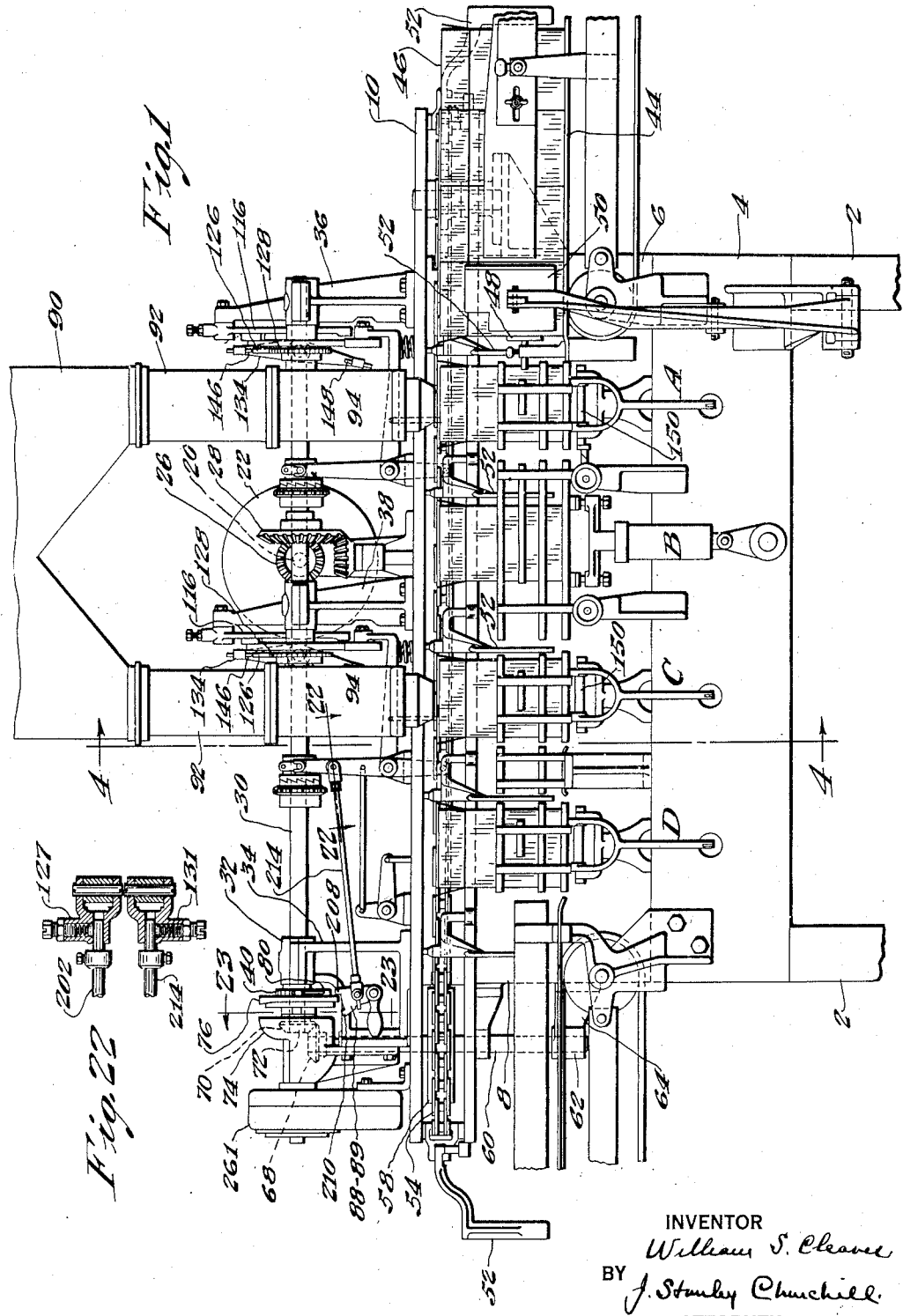
INVENTOR
William S. Cleaves
BY J. Stanley Churchill
ATTORNEY

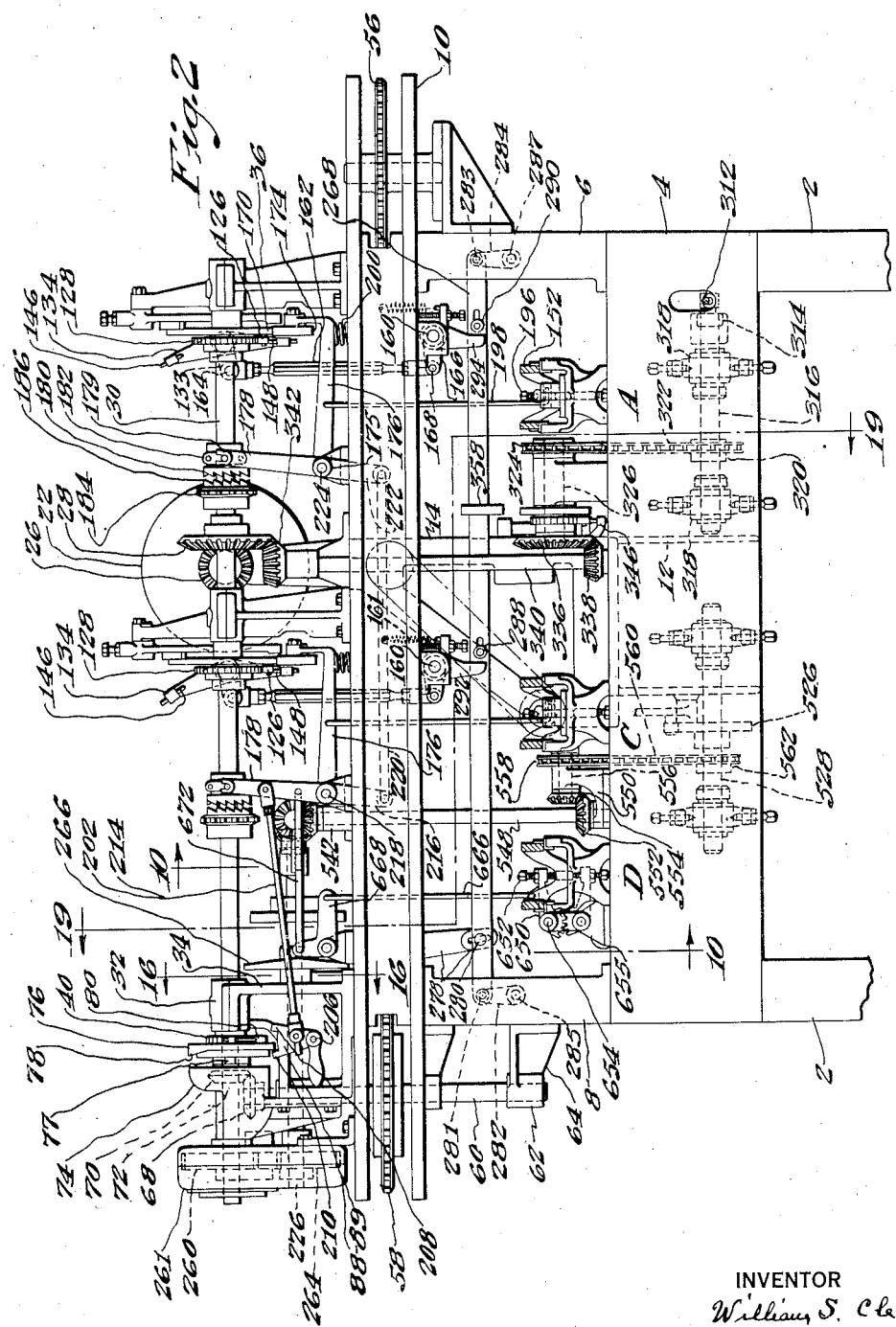

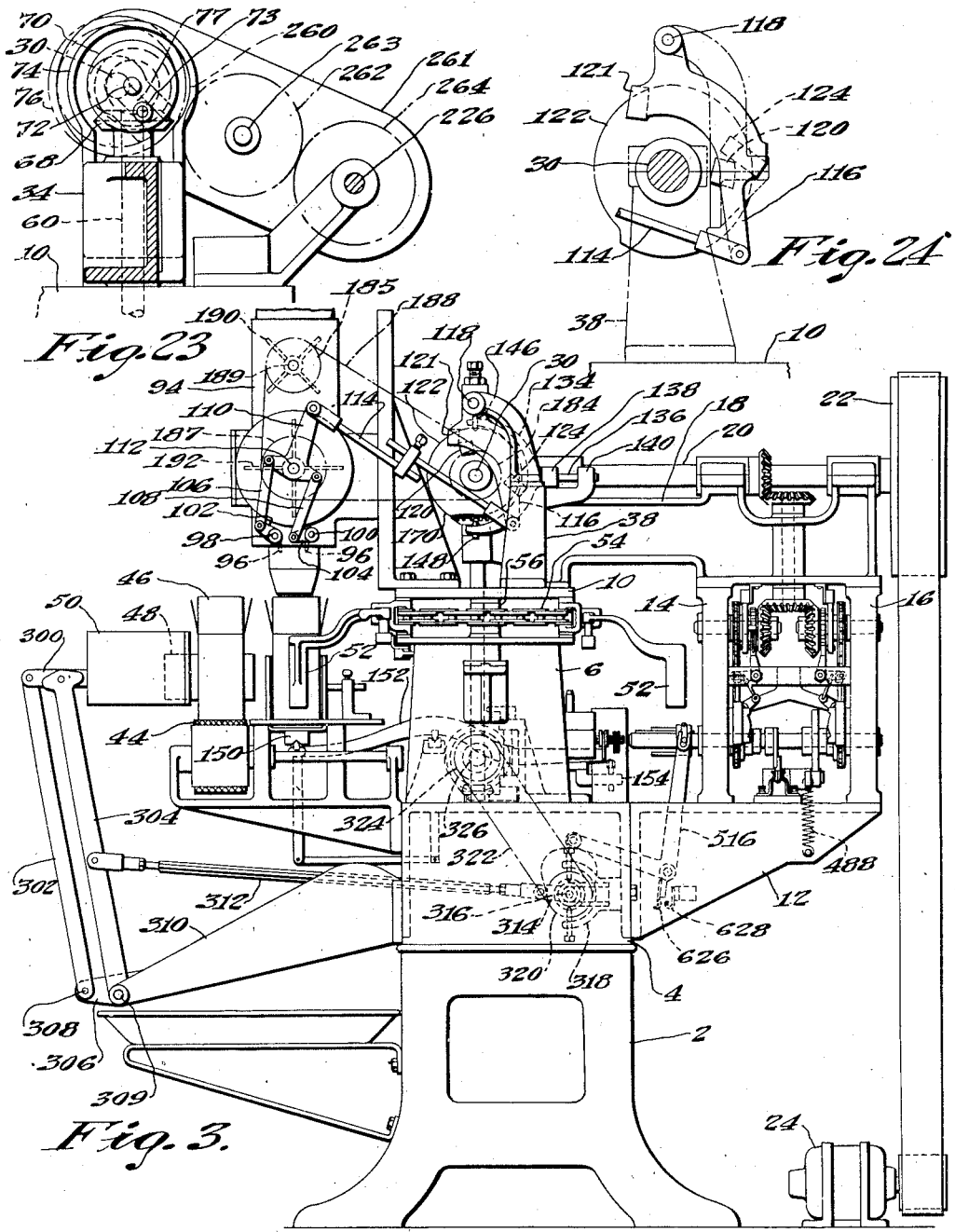

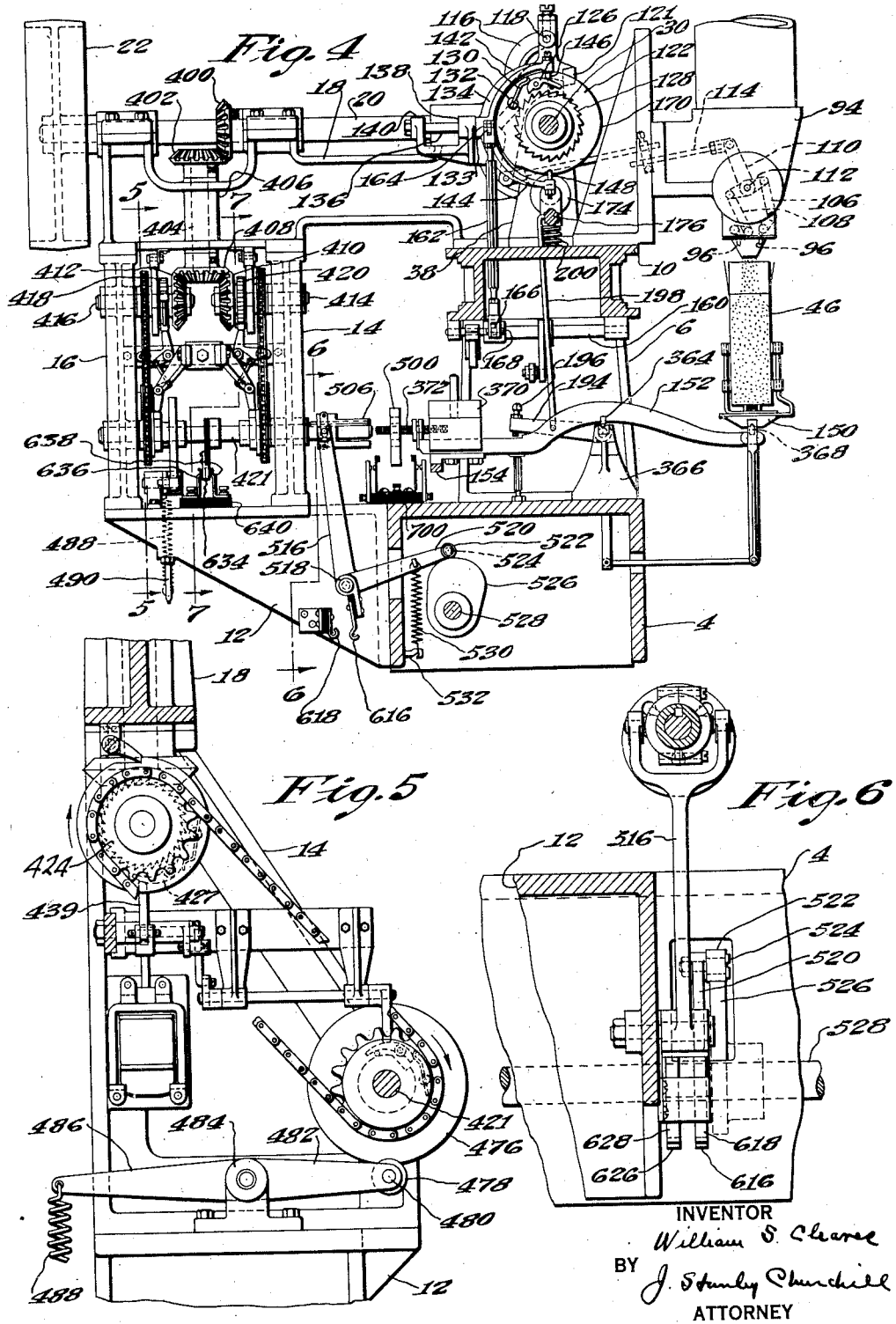

April 13, 1937.  W. S. CLEAVES  2,076,617
WEIGHING MACHINE
Filed July 13, 1934  7 Sheets-Sheet 5
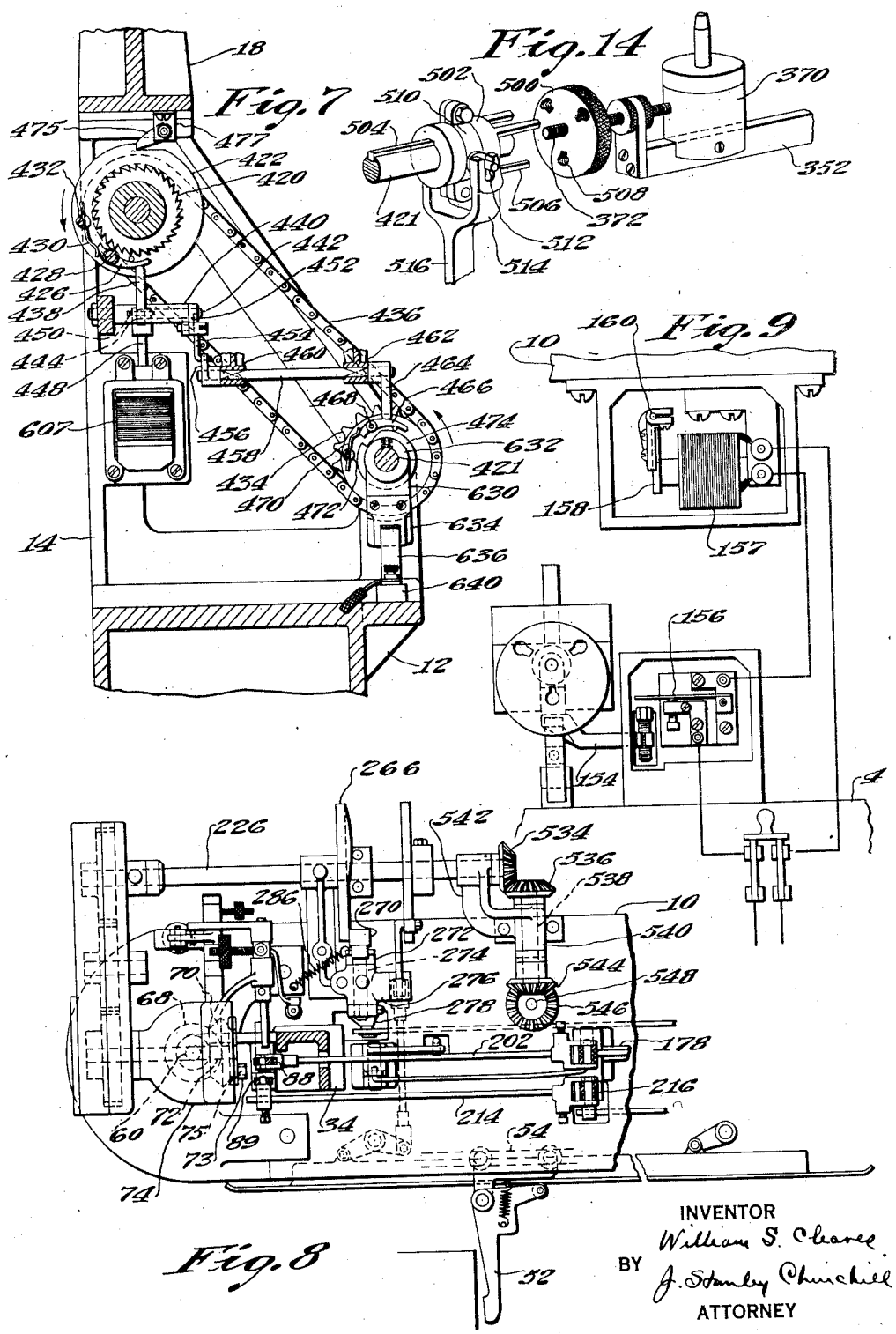
INVENTOR
William S. Cleaves
BY J. Stanley Churchill
ATTORNEY

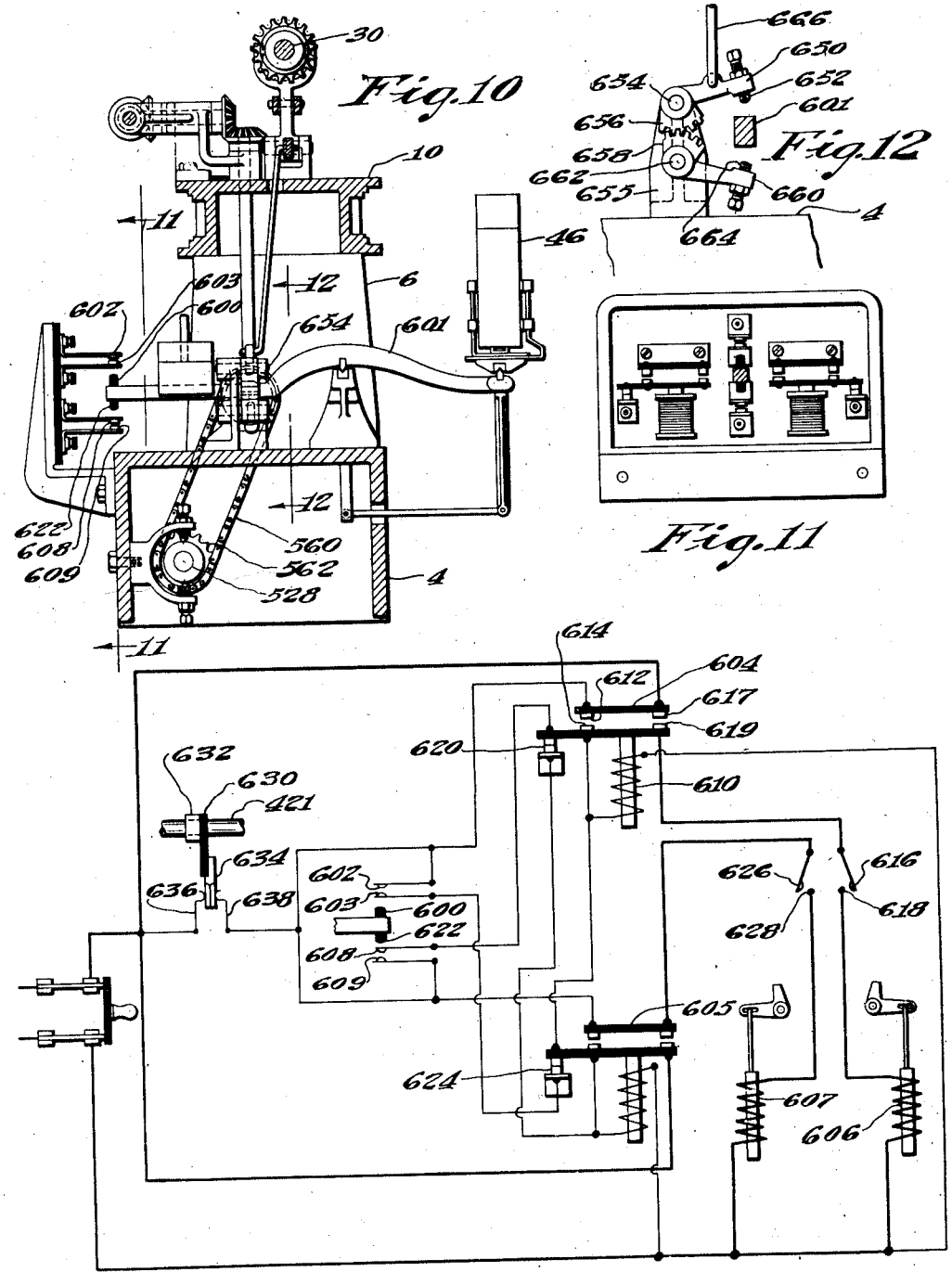

April 13, 1937.  W. S. CLEAVES  2,076,617
WEIGHING MACHINE
Filed July 13, 1934  7 Sheets-Sheet 7
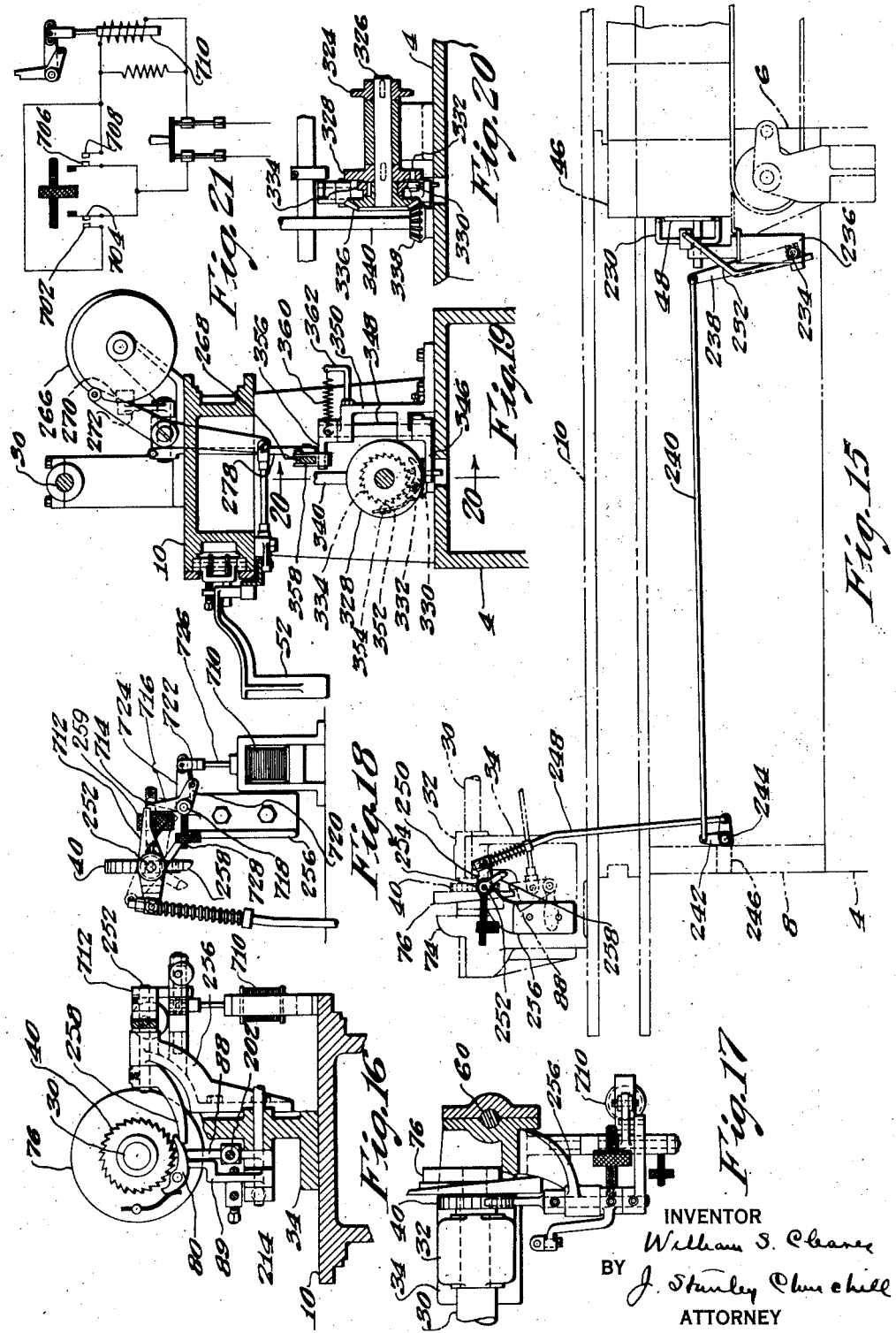
INVENTOR
William S. Cleaves
BY J. Stanley Churchill
ATTORNEY Patented Apr. 13, 1937

2,076,617

UNITED STATES PATENT OFFICE 2,076,617

WEIGHING MACHINE

William S. Cleaves, Wollaston, Mass., assignor to Pneumatic Scale Corporation, Limited, Quincy, Mass., a corporation of Massachusetts Application July 13, 1934, Serial No. 734,984

13 Claims. (Cl. 249—59)

This invention relates to a weighing machine, and more particularly to an automatic weighing machine.

In general, the invention has for an object to provide a novel and efficient automatic weighing machine in which provision is made for testing the loads weighed by the weighing machine and for automatically varying the operation of the weighing mechanism of the weighing machine when the tested load is found to vary from a standard load.

A further object of the invention is to provide a novel and efficient weighing machine in which provision is made for automatically varying the counter-weight of the weighing scale, in accordance with variations in the weights of tested loads from a standard.

With these objects in view and such others as may hereinafter appear, the invention consists in the weighing machine and in the structures, arrangements, and combinations of parts hereinafter described and particularly defined in the claims at the end of this specification.

In the drawings, Fig. 1 is a front elevation of the machine embodying the present invention; Fig. 2 is a similar view to Fig. 1 with parts omitted; Fig. 3 is an end elevation looking from the right in Fig. 1; Fig. 4 is a vertical sectional view on the line 4—4 of Fig. 1; Fig. 5 is a vertical sectional view on the line 5—5 of Fig. 4; Fig. 6 is a sectional view on the line 6—6 of Fig. 4; Fig. 7 is a vertical sectional view on the line 7—7 of Fig. 4; Fig. 8 is a sectional plan of the left hand portion of the machine shown in Fig. 1; Fig. 9 is a wiring diagram to be referred to; Fig. 10 is a vertical section on the line 10—10 of Fig. 2; Fig. 11 is a front elevation of the switch panel as seen from line 11—11, Fig. 10; Fig. 12 is a detail of the scale beam locking arms looking from line 12—12, Fig. 10; Fig. 13 is a wiring diagram to be referred to; Fig. 14 is a perspective view of the counter-weight and associated mechanism; Fig. 15 is a front elevation showing the package control device; Fig. 16 is a view partly in section taken on the line 16—16 of Fig. 2; Fig. 17 is a plan view partly in section of Fig. 16; Fig. 18 is a view looking from the right in Fig. 16; Fig. 19 is a sectional view taken on the line 19—19 of Fig. 2; Fig. 20 is a view in section taken on the line 20—20 of Fig. 19; Fig. 21 is a wiring diagram to be referred to; Fig. 22 is a sectional view taken on the line 22—22 of Fig. 1 showing slip joint connections; Fig. 23 is a sectional view taken on the line 23—23 of Fig. 1 looking in the direction of the arrow; and Fig. 24 is a detail of the hopper shutter lever and operating cams.

It is at the present time generally recognized that in weighing materials with automatic weighing machines, the materials vary in density from time to time during each day's run because of varying conditions, such for example, as variation in the air or moisture content, or in the variation of pressure at the delivery hopper. In the operation of automatic weighing machines, the supply of material is cut off from the feeding hopper by gates automatically closed by mechanism initiated by the balancing of the scale beam, and a column of material is therefore suspended in the air at the instant the gates close. If this suspended stream varies from time to time due to variation in its density or in its velocity due to varying head pressures, there will be produced an accompanying variation in the weights of the loads in the receptacles.

The present practice in the operation of these weighing machines involves the periodical removal of test packages from the run and the check weighing of them by an operator on a sensitive counter-scale and then compensating for such variation by adjusting the scale beam counter-weight of the weighing machine. This requires the constant and careful attention of an operator at all times, but nevertheless between these periods of checking by the operator many receptacles are likely to go through the machine either overweight or under-weight. Variations of this kind have been found in practice to amount to as much as one-half ounce for the larger packages.

In accordance with the present invention, the slightest variation in the weight of the load from a standard weight is detected and compensated for immediately with the result that a high degree of accuracy is maintained at all times without requiring attention of an operator, and in addition when an abnormal variation occurs so that an excessive adjustment or compensation has to be made, provision is made for automatically stopping the machine and the operator's attention attracted so that, if necessary, other adjustments may be made, such as varying the size of the supply stream or varying the agitation of the goods in the supply sources to re-establish the flow thereof in a more uniform manner reducing such excessive variations.

Referring to the drawings, the legs 2 support a lower platen 4 upon which is fastened end brackets 6, 8, which support the upper platen 10. A bracket 12, Fig. 3, secured to the lower platen 4 and having its upper surface in the same plane therewith supports two upright frame members 14, 16 forming a support for the weight adjusting mechanism hereinafter to be referred to. A bracket 18, one end of which is fastened to the upper platen 10, the other end being supported and fastened to the top of the frame members 14, 16 forms the bearing for a drive shaft 20 upon the outer end of which is fastened a pulley 22 driven from any source of power, as for example, by a motor 24 as shown in Fig. 3. A bevel pinion 26, Fig. 1, secured on the end of the drive shaft 20 meshes with a bevel gear 28 mounted on a main shaft 30 of the machine. The main shaft 30 has a bearing 32 at one end in a bracket 34, and at the other end in a bracket 36 and also has a central bearing in a bracket 38, these brackets all being fastened to the upper platen 10. The main shaft 30 is provided with a ratchet 40 forming part of a pawl and ratchet clutch for driving the carriers and associated mechanism to be described, and during operation, the main shaft 30 and the ratchet 40 are rotated continuously.

In the illustrated weighing machine the receptacle to be filled is first positioned on a scale where it receives a preliminary or bulk load supplied by a coarse heavy stream and the receptacle is usually filled to within a few ounces of the predetermined desired weight. This procedure is followed for the purpose of obtaining uniformity in the bulk loads. Thereafter the receptacle is moved onto a second or final weight scale where the remaining quantity of material is introduced by means of a fine or light stream to obtain the highest possible degree of accuracy in the final load.

Provision is made, as will be described, for conveying receptacles into the machine and conveying them therethrough step by step, first onto a scale at station A where the predetermined primary load is deposited in the receptacle, then to a settling station as at B where the material is settled in the receptacle, then to a second or final weight scale as at C where the material is introduced into the receptacle until a final weight is reached. The receptacle is then conveyed to a third or check weighing scale as at D where the receptacle is check weighed and thereafter is moved onto a discharge conveyor where it is carried away from the machine.

As herein shown, during the operation of the machine, a conveyor belt 44 driven from any suitable source, conveys the receptacles 46 into the machine until the foremost carton thereon engages a fixed stop 48 and a package pusher 50 is arranged to thereafter engage the first carton on the conveyor 44 and push said carton into the path of a series of carrier fingers 52. The package pusher 50 is arranged to operate in timed relation to the carrier fingers 52 which are attached to a chain 54 intermittently operated to advance the cartons successively through the machine to and from the stations above referred to. The chain 54 is arranged to run around an idler sprocket 56, Fig. 2, at one end of the machine and a driving sprocket 58 at the other end of the machine. The sprocket 58 is arranged to be driven from the main shaft 30 through the pawl and ratchet clutch 40 and to this end the sprocket 58 is secured to a vertical shaft 60 which is rotatably supported in a bearing 62 formed in a bracket 64 secured to the bracket 8 and has a bearing at its upper end in the bracket 34. A mitre gear 68 fastened to the top of the vertical shaft 60 meshes with a mitre gear 70 fast on a short shaft 72 rotatably mounted in a bracket 74 which is fastened to the bracket 34. In order to provide a slow stop and start movement of the carrier chain an eccentric driving connection is employed. For this purpose the shaft 72 is slightly eccentric in relation to the main shaft 30 as shown in Fig. 23. The driving connection includes a roller 73 mounted on a pin 75 fast in the back of the bevel gear 70 which is arranged to project into a slot 77 cut in the face of a disc 76. The disc 76 is mounted free to turn on the end of the main shaft 30 adjacent to the ratchet 40 and when the disc 76 is caused to make one revolution, as will be hereinafter described, the shaft 72 is caused to make one revolution with a varying angular velocity. To complete the driving connection between the main shaft 30 and the shaft 72 the disc 76 carries a spring-pressed pawl 80 which is arranged to engage with the teeth of the ratchet 40 on the main shaft 30. The carrier fingers 52 are so positioned on the carrier chain 54 that one revolution of the shaft 60 advances the carton 46 one station.

The weighing machine illustrated in the drawings operates in successive cycles, and during the first part of each cycle the filling, weighing and tapping operations take place. After the cartons on the scale pans have made their weights, the second part of the cycle is permitted to begin and the carrier fingers 52 are actuated. Provision is made for controlling the operation of the pawl and ratchet clutch 40 so that the carrier fingers 52 will be prevented from advancing the cartons until the weighing operations have been performed. For this purpose pawl stops 88 and 89 are provided as shown in Figs. 1, 2 and 16, which are normally held in position to prevent the pawl 80 from engaging with its ratchet 40 while the filling and weighing operations are taking place. At the termination of the filling and weighing operations the pawl stops 88 and 89 are moved from the position shown in Fig. 1 to the position shown in Fig. 2, allowing the pawl 80 to engage with its ratchet 40 and move each package one station. The pawl stops 88 and 89 are returned to the position shown in Fig. 1 to disengage the pawl 80 from the ratchet 40 and thereby stop the carriers at the end of the revolution. The pawl stops 88 and 89 are actuated by the weighing mechanisms as will be hereinafter described.

The filling and weighing mechanisms, indicated generally by the letters A and C in the illustrated machine, will now be described. Inasmuch as the filling and weighing mechanisms are alike in form and construction, a description of one will suffice for both. The weighing mechanisms operate during the first half of each cycle, as above stated, to deliver material into the cartons which have previously been brought into position on the scale pans by the carrier fingers 52. A supply hopper 90 containing material to be weighed into the receptacles is provided with pipes 92 which guide the material to feeding hoppers 94 provided with a pair of shutters 96, Fig. 3, arranged to be opened to allow goods to flow into the receptacles until the desired predetermined weight has been reached and to be closed when such weights have been deposited in the receptacle. The shutters 96 are mounted on rocking shafts 98 and 100 operatively connected through arms 102 and 104, links 106 and 108 and a rocking lever 110 free on a stirrer shaft 112. The rocking lever 110 operates to open and close the shutters 96 through connections including an adjustable connecting rod 114, one end of which is pivotally mounted on one arm of the rocking lever 110, the other end being pivotally connected to a rocking lever 116 which is frictionally mounted on a pin 118. During the operation of the machine when the rocking lever 116 is in the position shown in Fig. 3 the shutters 96 will be in the open position and when moved to the left will be closed.

This rocking motion is imparted to the rocking lever 116 by means of a cam block 120 mounted on a rotating disc 122 which rotates counter clockwise and during one-half of its revolution contacts with a cam block 124 on the rocking lever 116, moving the rocking lever 116 to the right as viewed in Fig. 3 and Fig. 24. During the other half of the revolution of the disc 122 the cam block 120 contacts with a second cam block 121 on the rocking lever 116 moving it to the left as viewed in Fig. 3 closing the shutters 96. The rotation of the disc 122 is effected through connections to be described.

The disc 122 is mounted free on the shaft 30 and carries on one face thereof, a pawl 126, Fig. 4, arranged to engage with the teeth of a ratchet 128 fast on the shaft 30. A spring 130 fast in a pin 132 attached to the disc 122 normally tends to hold the pawl 126 in engagement with the teeth in the ratchet 128. A yoke 134 fastened to a pin 136 which is free to rock in bearings 138 and 140 formed in an arm of the bracket 38 comprises two arms 142 and 144 provided with hardened pins 146 and 148 mounted in the ends thereof. During the operation of the machine when the yoke 134 is rocked so that the pawl 126 is held out of engagement with the teeth of the ratchet 128 by the pin 146 as shown by Figs. 1 and 4, the machine is operating on the weighing part of its cycle of operation. At this time the shutters 96 are open, a receptacle is in position on a scale pan 150, and a scale beam 152 is arranged to be unlocked so that it is free to balance when the predetermined quantity of material is deposited therein. When the yoke 134 is rocked into the position shown in Fig. 2, the pin 148 is in position to engage the pawl 126 and hold it out of contact with the ratchet 128 so that the machine will operate on the package moving part of its cycle. During this time, the shutters 96 are closed, the scale beam 152 is arranged to be locked and the package is being advanced one station.

Provision is made for effecting the movement of the yoke 134, during the operation of the machine and to this end an arm 154 attached to the counter-weight end of the scale beam 152 is arranged to open a switch 156 of an electric circuit as shown in Fig. 9 when the scale had made its weight. This circuit includes an electromagnet 157 which releases an armature 158 fast on a rock shaft 160 when the switch 156 is opened allowing the shaft 160 to be rocked in a clockwise direction as viewed in Fig. 9 or in a counter clockwise direction as viewed in Fig. 2 by the spring 161. This action rocks the yoke 134 in a counter-clockwise direction from the position as viewed in Fig. 1 to the position shown in Fig. 2 moving the pin 146 out of engagement with the pawl 126 and allowing the pawl to engage with the teeth of the ratchet 128. At the same time, the pin 148 moves into position to disengage the pawl 126 when the disc 122 has made a half revolution. The yoke 134 is operatively connected to the shaft 160 through connections including a link 162, one end of which is pivotally connected to an arm 133 projecting from the yoke 134 by a pin 164, the other end being pivotally connected to the outer end of a lever 166 fast on the rock shaft 160 by a pin 168.

From the description of the illustrated machine thus far it will be seen that during one-half of the revolution of the disc 122 the shutters are open and material is allowed to feed into the carton on the scale pan. During this time provision is made to loosen the material in the hoppers to aid the feeding operation and for this purpose stirrers 190 and 192, Fig. 3, are provided. The stirrers 190 and 192 are arranged to be rotated when the shutters 96 are open and to this end the disc 122 is provided with a cam surface 170 on its periphery which cooperates with a roll 174, Figs. 2 and 4, mounted on one arm 176, Fig. 2, of a bell crank lever 175. A second arm 178 of the bell crank lever 175 is provided with a forked end 179 which operatively engages a sliding collar 182 slidably keyed to the shaft 30 and rotatable therewith. The collar 182 is provided with teeth 180 cut in one face thereof and arranged to engage with teeth 186 cut in the face of a sprocket 184 which is free to turn on the shaft 30. When the teeth 180 and 186 are engaged, the stirrers 190 and 192 are rotated by means of a chain 188, Fig. 3, running over the sprocket 184 and over sprockets 185 and 187 on shafts 189 and 112 respectively of the stirrers 190 and 192. It will thus be observed that the stirrers 190 and 192 are controlled to operate only during the weighing portion of the cycle of operation of the machine.

During the portion of each cycle of operation of the machine in which the cartons are being moved onto the scale pans, the scale beam 152 is locked by a locking arm 194, Fig. 4, provided with a screw 196 in the outer end thereof which engages the scale beam 152. The locking lever 194 is held down by the cam surface 170 on the periphery of the disc 122 through the roller 174, the arm 176, Fig. 2, and a link 198. After the carton has been positioned the set screw 196 and the lever 194 are raised by a spring 200 under the arm 176 to unlock the scale beam preparatory to the start of the weighing operation.

Provision is made for actuating the pawl stops 88 and 89, above referred to, in order to start the carrier moving cycle of operation of the machine. As above stated, the pawl stops are controlled by the weighing mechanisms and, as herein shown, a connecting rod 202, see Fig. 2, connects the arm 178 of the secondary load scale with the pawl stop 88 which is loosely mounted on a stud 206 directly behind the similar pawl stop 89 having the same contour as shown in Fig. 1. Each pawl stop is provided with a pawl stopping projection 208 and a cam engaging projection 210 on the upper edges thereof. The movement of the arm 178 operates to move the pawl stopping projection 208 of the pawl stop 88 out of the path of travel of the pawl 80 which is pivotally mounted on one face of the pawl carrier disc 76 as described. The second pawl stop 89 is connected in like manner to the first or primary load scale through a connecting rod 214, a double arm lever 216 freely mounted on a pin 218, a connecting rod 220, and a lever 222 attached to a shaft 224 to which the arm 178 is attached. It will thus be seen that before the pawl 80 is free to engage the teeth of the ratchet 40 the receptacles on the primary load scale A and on the final weight scale C must have received their predetermined weight and the pins 146 in the yokes 134 moved out of engagement with the pawls 126. Slip joint connections 127 and 131, Fig. 22, provided on the ends of the connecting rods 202 and 214 permit the pawl engaging projections 208 to be moved back into the path of travel of the pawl 80 in position to disengage it from the ratchet 40 when the pawl 80 has made one revolution independently of the movement of the arms 178. For this purpose a cam surface 78, Fig. 2, is provided on one face of the pawl carrying disc 76 which is arranged to engage with the projection 210 on the pawl stops 88 and 89 before the disc 76 has completed a revolution to move the pawl stop projections 208 into the path of travel of the pawl 80.

Having described the manner in which the weighing part of the cycle of the machine operates, a description will now be given more particularly in relation to the receptacle moving and scale resetting portion of the cycle of operation hereinbefore referred to.

When the pawl stopping projections 208 are moved from the pawl 80 both scales A and C having balanced, the pawl 80 engages with the teeth of the ratchet 40 and the receptacles are moved one station by the carriers 52. At the same time a secondary shaft 226, Fig. 8, is caused to make one revolution as will be described whereby the circuit in Fig. 9 is reestablished, a package is moved from the incoming conveyor 44 into position in front of the carrier 52, the yoke 134 is reset for weighing, as shown in Fig. 1, the scale is unlocked, and the hopper shutters 96 are opened allowing the material to flow into the receptacles and the stirrers 190 and 192 started, as described.

When a weighing machine such as that forming the subject matter of the present application is used in combination with another machine, such as a carton forming machine, it sometimes happens that the supply of cartons from the other machine to the weighing machine is discontinued, for some reason. When this occurs it is desirable to stop the weighing machine in order to prevent the discharge of material from the hoppers thereof when there are no cartons in position to receive said material. Accordingly, in the illustrated embodiment of the invention, provision is made for preventing the carton feeding operation of the machine unless there is a carton present on the inlet conveyor 44 in position to be pushed into the path of the carrier fingers 52 by the pusher plate 50. To this end a feeler member 230, Fig. 15, is provided which is mounted on the end of an arm 232 fast on a rod 234 and free to rock in bearings formed in a bracket 236 attached to the frame of the machine. An arm 238 also fast on the rod 234 is connected by a connecting rod 240 to one arm of a bell crank lever 242 which is freely mounted on a stud 244 supported by a bracket 246 attached to the machine frame. The other arm of the bell crank lever 242 is yieldingly connected by a connecting rod 248 to an arm 250 fast on a shaft 252 supported in a bearing 254 in a bracket 256 attached to the bracket 34. A pawl stop 258 fast on the shaft 252, Fig. 16, and normally positioned in the path of travel of the pawl 80 will be moved out of such position when a package is present against the finger 230 and will allow the pawl 80 to engage the teeth of the ratchet 40 and conversely when there is no package present against the finger 230 the machine will be prevented from starting on its package carrying cycle of operation until such time as a carton is present on the inlet conveyor. The pawl stop 58 is normally held in the path of travel of the pawl 80 by the weight of the connecting rod 248 which is partially counterbalanced by the adjustable weight 259, Fig. 18.

The yokes 134 are rocked clockwise, as viewed from Fig. 2, to remove the lower pins 148 from engagement with the tails of the pawls 126 at the end of the half cycle during which the cartons have been moved by the carriers 52. This rocking of the yokes in a clockwise direction is effected by a cam 266 Figs. 2 and 8, on the counter-shaft 226, Fig. 8, the latter being driven through a gear 260, Figs. 2 and 23, fast on the shaft 72, an idler gear 262, Fig. 23, free on a stud 263 fast in a gear housing 261 and through a gear 264 fast on the shaft 226. The cam 266 fast on the shaft 226 is arranged to move a resetting bar 268 to the left in Fig. 2. A cam roll 270, Fig. 8, which cooperates with the cam 266 is carried by a lever 272 which is secured to a pin 274 mounted in a bracket 276 on top of the upper platen 10. Fast on the other end of the pin 274 is a lever 278 which extends down through the platen 10, Fig. 2, to the resetting bar 268. An elongated slot in the lever 278 cooperates with a stud 280 fast in the resetting bar 268. The resetting bar is mounted to reciprocate and is supported by pins 281 and 283 in the ends of levers 282 and 284 arranged to rock freely on studs 285 and 287 fast in the end frames 6, 8. A spring 286, Fig. 8, holds the roll 270 against the cam 266. Two pins 288 and 290, Fig. 2, adjustably fastened to the bar 268 are provided to reset the yokes 134 on the drip scale mechanism C and the primary load scale mechanism A, respectively. The pins 288 and 290 are arranged to contact with arms 292 and 294 fast on the rock shafts 160 and as a result the yokes 134 are rocked from the position shown in Fig. 2 to that as shown in Fig. 1. This movement of the rock shaft 160 resets the armature 158, Fig. 9, of the electromagnet 157 which holds the yoke in this position until the weighing operation has been completed, at which time the circuit will be broken through the switch 156 as previously described.

When the yokes 134 are rocked the pins 148 release the pawls 126 allowing them to engage the teeth of the ratchets 128 and turn the discs 122 one-half revolution. When these discs are turned the cam blocks 120 operate on their cam blocks 121 of the swinging levers 116 and open the shutters 96 as described. Also when the discs 122 make one-half revolution the cam surfaces 170 allow the arms 176 to rise under the action of the springs 200 which actuate the arms 178 to engage the teeth 180 of the sliding collars 182 and the sprockets 184 and start the stirrers in the feeding hoppers. At the same time the arms 194 are raised out of engagement with the scale beams 152, leaving them in free weighing position.

As previously stated, provision is made for pushing packages from the incoming belt 44, Fig. 3, into the path of the carrier finger 52 and this provision comprises the package pusher 50 mounted on a bar 300 pivotally supported by an outer link 302 and an inner link 304, the link 302 being pivotally connected to an extension 306, by a stud 308, which is fast in the end of a bracket 310 attached to the frame of the machine. The lower end of the inner link 304 is also pivoted on a stud 309 and forms a four bar linkage producing a substantially straight line horizontal motion to the package pusher 50. A connecting rod 312 pivotally connects the arm 304 with a crank 314 fast on a shaft 316 which is mounted in bearings 318 attached to the machine frame. The shaft 316 is driven through a sprocket 320, a chain 322 and a sprocket 324 fast on a shaft 326 which is caused to make one revolution at the end of the package moving portion of the cycle of operation of the machine, as will be described.

Referring to Figs. 19 and 20, the shaft 326 has a disc 328 fast thereon which carries a pawl 330 mounted free on a pin 332 fast in the disc 328. A ratchet 334 attached to a bevel gear 336 is mounted free to turn on the shaft 326. This bevel gear 336 and ratchet 334 is driven through a bevel gear 338, a shaft 340, a bevel gear 342, Fig. 2, and a bevel gear 28 fast on the main shaft 30. A pawl stop 346 mounted on a vertical shaft 348, Fig. 19, supported to turn in a bracket 350 attached to the machine frame is arranged to be moved into and out of the path of travel of the pawl 330. A spring 352 attached to the disc 328 by a stud 354 normally tends to hold the pawl 330 in engagement with the teeth of the ratchet 334 while the pawl stop 346 normally tends to hold it out of such engagement. An arm 356 secured to the top of the shaft 348 projects out into the path of travel of an adjustable pin 358 clamped on the bar 268 and contacts with the end of the arm 356 to move the pawl stop 346 out of engagement with the pawl 330 when the bar 268 is moved to the left in Fig. 2. A spring 360, one end of which is attached to the arm 356, the other end being attached to a spring hook 362 fast in the bracket 350 returns the pawl stop 346 into the path of the pawl 330 permitting it to make one revolution. The timing of the cam 266, Fig. 8, which operates the bar 268 is such that the pawl stop 346 is caused to be removed at the last end of the package moving portion of the cycle of operation so that the carrier fingers 52 have substantially come to rest at the time the package pusher 50 operates to move a package in their path.

From the description thus far it will be seen that during the operation of the machine, the cartons are pushed into the machine, carried to the bulk loading scale A, thence to the tapping mechanism B and thereafter to the final load scale C, as previously stated. The carton is then carried to a testing scale D where provision is made, as will be described, to automatically set in motion a counter-weight varying or adjusting mechanism on the final weight scale C, which will now be described. Accordingly, as illustrated in Fig. 4, the final weight scale beam 152 is mounted on knife edges 364 in a bracket 366 secured to the machine frame. The scale pan 150 mounted on knife edges 368 is provided at the weighing end of the beam and a large counter-weight 370 is mounted at the counter-weight end of the beam. The counter-weight end of the scale beam is also provided with a smaller or auxiliary counter-weight 500 which takes the form of an eccentric nut and is adjustably mounted on a threaded stud 372 secured to the large counter-weight 370. The weight 500 is made eccentric so that it will remain in adjusted position with its heavier side downward. The purpose of the counter-weight adjusting mechanism, which will now be described, is to adjust the auxiliary counter-weight 500 in order to vary the effective counter-weight on the scale beam 152 to either increase or decrease the effective counter-weight, accordingly, as the testing scale D, indicates either an over-weight or an under-weight from a desired predetermined weight. To this end, as illustrated in Fig. 4, a bevel gear 400 secured to the drive shaft 20 meshes with and drives a bevel gear 402 secured to the top of a vertical shaft 404 supported in a bearing 406 in the bracket 18. Bevel gears 410 and 412 loosely mounted on studs 414 and 416 in the brackets 14, 16 respectively are arranged to be rotated in opposite directions by a bevel gear 408 secured to the lower end of the shaft 404. Driving ratchets 418 and 420, secured to and rotatable with the bevel gears 410 and 412 are arranged to drive a shaft 421 through pawl and ratchet clutch mechanisms and chain and sprocket drives, to be described. The shaft 421 is rotatably supported in the brackets 14, 16 and will be rotated in either a clockwise or counter-clockwise direction depending on whether it is driven by the ratchet 418 or the ratchet 420. Since the clutch mechanisms producing the rotation in either direction are the same, the mechanism for producing rotation in one direction only will be described.

As illustrated in Figs. 4 and 7, a pawl carrier disc 422 having a sprocket 424 attached to the hub thereof is provided with a pawl 426 pivotally mounted on a stud 428 fast in the disc 422 and also a spring 430 held in a stud 432 fast in the disc 422. Spring 430 operates normally to force the pawl 426 in contact with the teeth of the ratchet 420. The sprocket 424 drives a sprocket 434 which is free on the shaft 421 by means of a chain 436 when the pawl 426 is in contact with the teeth of the ratchet 420. A pawl stop arm 438 formed on one end of a sleeve 440 mounted free to rock on a stud 442 secured to the frame of the machine is normally held in the path of travel of the pawl 426 and holds it out of engagement with the teeth of the ratchet 420. An arm 444 also formed on the sleeve 440 has its outer end connected to the armature of an electromagnet 607 through a connecting rod 448 pivotally connected by a pin 450. The pawl stop 438 is removed from contact with the pawl 426 when the electromagnet is energized to lift its armature, as will hereinafter be described. On one end of the sleeve 440 an arm 452 projects out and is swivelly connected by a connecting rod 454 to an arm 456 secured to the end of a shaft 458 rotatably supported in bearings 460 and 462 fastened to the frame work of the machine. On the opposite end of the shaft 458 a pawl stop arm 464 is attached and is normally held in the path of travel of a pawl 466 pivotally mounted on a pin 468 fast in the side of the sprocket 434. A spring 470 attached by means of a pin 472 fast in the sprocket 434 normally tends to force the pawl 466 into engagement with the tooth cut in a collar 474 which is fast on the shaft 421. It will thus be observed that when the electromagnet 607 is energized to lift its armature the pawl stop 438 is removed from contact with the pawl 426 and at the same instant the pawl stop 464 is likewise removed from the pawl 466. The pawl 426 engaging with the teeth of the ratchet 420 and the pawl 466 engaging with the tooth of the hub 474 start the shaft 421 in rotation. A stationary pawl 475 is mounted in an angle piece 477 to engage with a tooth in the disc 422 to prevent rotation of the ratchet in the opposite direction.

Before the shaft 421 has made one revolution, the pawl stops 438 and 464 are moved back into the path of travel of their respective pawls 426 and 466 disengaging them from the ratchet teeth 420 and the tooth on hub 474 respectively and stopping the shaft 421 when it has made one complete revolution.

Provision is made for holding the shaft 421 in proper registered angular position and comprises a disc 476 fast on the shaft 421 and having an arcuate cut-out portion with which a pressure roll 478 cooperates. The roll 478 is mounted free on a stud 480 fast in one arm 482 of a two-arm lever 484; the other arm 486 being yieldingly held by a spring 488, one end of which is fast to the end of the arm 486, the other end being fast to a spring pin 490 attached to the machine frame.

With this arrangement it will be seen that rotation of the shaft 421 is effected by either one of the clutch mechanisms, independent of the other and also that rotation in one direction will not effect the mechanism for effecting rotation in the opposite direction. For example, if the shaft 421 is rotated in a clockwise direction by the mechanism shown in Fig. 5, the ratchet 474 of the opposing mechanism, shown in Fig. 7, will be rotated in a clockwise direction, but will not disturb the rest of the mechanism. However, the ratchet 474 will be returned to its original position at the end of the revolution to be prepared to effect rotation in the opposite direction if required.

During the period of rest of the weighing mechanism which occurs during the package moving portion of the cycle of operation of the machine, provision is made for connecting the adjustable counter-weight 500 with the shaft 421 so that it may be adjusted to compensate for the variation in the weight of the stream of material still in the air when the scale balances, thereby increasing or decreasing the amount of material required to balance the scale as determined by the check weight scale. This is accomplished by a collar 502, Fig. 14, keyed to the shaft 421 by an elongated key 504 but free to slide thereon, the collar 502 being provided with prongs 506 arranged to fit freely into holes 508 in the counter-weight 500. The collar 502 is provided with a loosely fitting yoke 510 operating in an annular groove and the yoke 510 is provided with pins 512 projecting from the sides thereof which engage with a forked end 514 of an arm 516 loosely mounted on a stud 518, Fig. 4, fast in the frame of the machine. An arm 520 fixed to the arm 516 is provided with a roll 522 mounted on a stud 524 fast in the arm 520. The roll 522 bears on the periphery of a cam 526 fast on a shaft 528, the roll 522 being held in engagement with the cam 526 by means of a spring 530, one end of which is attached to the arm 520, the other end being attached to a spring pin 532 fast in the frame of the machine.

Provision is made to revolve the shaft 528 one revolution during the package moving portion of the cycle of operation of the machine and, as herein shown, see Figs. 2 and 8, a bevel gear 534 fast on the secondary shaft 226, which is caused to make one revolution during the package moving portion of the cycle of operation as previously described, meshes with a bevel gear 536 on the end of a short shaft 538 rotatably mounted in a bearing 540 formed in a bracket 542 attached to the machine frame. A bevel gear 544 fast on the opposite end of the shaft 538 meshes with a bevel gear 546 on the top of a vertical shaft 548, the upper end of which is rotatably supported in the bracket 542. The lower end of the shaft 548 is rotatably supported in a bracket 550 attached to the machine frame. A bevel gear 552 fast on the lower end of the shaft 548 meshes with a bevel gear 554 fast on the end of a shaft 556 rotatably supported in the bracket 550. A sprocket 558 fast on the opposite end of the shaft 556 is arranged to drive the shaft 528 through a chain 560 and a sprocket 562 which is fastened to the shaft 528. The driving ratio of the gears and sprockets is such that when a secondary shaft 226 makes one revolution the shaft 528 likewise makes one revolution. As the shaft 528 makes one revolution each cycle of operation of the machine, it will be seen that the prongs 506 will connect with the auxiliary counter-weight 500 each cycle, through the connections described, regardless of whether the turning mechanism is actuated or not.

As above stated, provision is made to automatically set in motion the counter-weight adjusting mechanism and to this end the testing scale D, see Fig. 10, is provided with a scale beam 601 mounted in a similar manner to the final weight scale beam 152. The scale beam 601 is provided with insulated contact closing members 600 and 622, at its counter-weight end, which are arranged to strike either of two sets of contact points, and 602 and 603, or 608 and 609, depending on whether the carton on the pan end of the scale beam is over-weight or under-weight. During the operation of the machine, if the receptacle on the scale pan contains the exact predetermined amount of material required it is carried on out of the machine, no adjustment being necessary, but if it should not be of an exact predetermined weight, one of the circuits, see Fig. 13, is closed initiating the operation of the mechanism for adjusting the auxiliary counter-weight 500 in the direction necessary to correct such variation. If, for example, the receptacle on the scale beam should be over-weight, the counter-weight end of the scale beam will rise and the contact member 600 on the end of the scale beam 601 will strike and close the contacts 602 and 603 closing that part of the over-weight circuit which contains a magnetic switch 604 and an electromagnet 606. If, however, the receptacle is found to be under-weight the contacts 608 and 609 are closed completing part of the under-weight circuit which includes a magnetic switch 605 and an electromagnet 607. Assuming, for example, that an over-weight occurs and the contact member 600 on the scale beam has closed the contacts 602 and 603, current will flow from the source of power energizing a coil 610 of the magnetic switch 604, the purpose of which will be described, to close it. As soon as the magnetic switch 604 is closed, it is held closed by the magnet coil 610 receiving its energy through contacts 612 and 614 of the switch 604 so that when the contacts 602 and 603 are opened by movement of the scale beam 601 to a neutral position the current in the circuit will be available to energize the coil 606 through contact points 617 and 619 of the magnetic switch 604 and contacts 616 and 618 in the line between the switch 604 and the coil 606. The contacts 616 and 618 are provided in order to prevent the turning mechanism from starting until the prongs 506 have entered the holes in the counter-weight 500. The contact member 616 attached to an extended end of the lever 516 is arranged to strike the contact member 618, secured to and insulated from the frame, when the prongs 506 have entered, as clearly shown in Fig. 4. This connection completes the circuit to energize the over-weight coil 606 which operates to remove a pawl stop 439, Fig. 5, out of the path of travel of a pawl 427, and a pawl stop 464 similar to that shown in Fig. 7 out of the path of travel of a pawl 466, as previously described, and the shaft 421 is rotated one turn in a clockwise direction, as viewed in Fig. 5, to rotate the counter-weight 500 one turn in a clockwise direction as viewed in Fig. 14. A contact member 620 is provided on the magnetic switch 604 to be opened when the switch 604 closes to prevent the closing of a magnetic switch 605 in the under-weight portion of the circuit in the event that the scale beam should be disturbed to close the contact members 608 and 609.

In like manner, if the receptacle on the scale pan is found to be light or under-weight, the counter-weight end of the scale beam will fall and the contact member 622 will close the contacts 608 and 609 for the under-weight portion of the circuit, thereby closing the magnetic switch 605 and opening contacts 624, provided thereon to prevent the closing of the over-weight magnetic switch 604 in case the scale beam 601 has been disturbed to close the contacts 602 and 603 of the overweight circuit. Contacts 626 and 628 of the arm 520 are closed, in a similar manner to that described for the overweight receptacle to complete the circuit in the electro-magnet 607 which operates the pawl stop 438 and 464 and hence rotates the pronged collar 502 and counter-weight 500 in the opposite or counter-clockwise direction, as viewed in Fig. 14. As the testing scale necessarily indicates whether the weight in the filled carton is over-weight or under-weight during the weighing cycle of operation of the machine, the coil switch 604 is arranged to hold the circuit closed until such time as the scale beam comes to rest. Provision is made for opening the circuit during the revolution of the shaft 421 to release whichever one of the magnetic switches 604 and 605 have been closed and allow the pawl stop 438 or 439 to move back into the path of travel of its respective pawl so that the shaft 421 will be stopped at the end of one revolution. This provision comprises an insulated member 630 attached to a hub 632 fast on the shaft 421, the insulated member 630 having a contacting member 634 which connects terminals 636 and 638 carried on an insulating block 640 fast on the machine frame. The contacting member 634 is normally in position to close the terminals 636 and 638 but as soon as the shaft 421 starts the circuit is broken. The member 634 is brought back to its original position at the end of the revolution.

The contacts 636 and 638 are normally in closed position, and when, for example, an over-weight is determined by the testing scale, contacts 602, 603 are closed to complete a circuit from one side of the line through contacts 636, 638, contacts 602, 603, and contact 624 of the magnetic switch 605, which contact 624 is normally closed, through the winding 610 of the switch 604 to the other side of the line. The armature of this switch moves upwardly to close contacts 612. This completes a locking circuit from one side of the line through contacts 636, 638, contacts 612, 614, and winding 610 to the other side of the line to hold the switch 604 closed. The upward movement of the armature of switch 604 opens contacts 620 of this switch, which contacts correspond to contacts 624 of switch 605, so that a circuit cannot be completed when contacts 608, 609 are closed when the scale determines an under-weight, thereby preventing switch 605 from operating when switch 604 is energized.

When the armature of magnetic switch 604 moves upwardly, contacts 617, 619 are also closed to connect contact 616 with one side of the line, and this connection is maintained as long as switch 604 is closed.

When arm 516 of Fig. 4 is actuated to move pins 506 into engagement with the apertures in weight 500, contacts 616, 618 are closed to complete a circuit from one side of the line through contacts 617, 619 and contacts 616, 618 through the winding of switch 606 to the other side of the line. Magnet 606 lifts its armature to remove pawl stop 439 from the path of travel of pawl 427 and pawl stop 464 from the path of travel of pawl 466, as previously described, to cause one rotation of shaft 421 in one direction so as to turn auxiliary counterweight 500 one revolution. Shortly after shaft 421 starts to rotate, contact 634 is removed from between contacts 636, 638 so as to open the holding circuit of switch 604, which had been maintained closed, through contacts 612, 614 to de-energize winding 610 of switch 604 to open the same. The shaft 421 continues to revolve until it has made one complete revolution, at which time contact 634 is again positioned between contacts 636, 638 to condition the circuit for the above operation.

The circuit of switch 605 is entirely similar to the circuit of switch 604 above described. The holding circuit closed by contacts 612, 614 is necessary since the scale beam 152 of the testing scale may be moved to disengage contacts 602, 603, as by the scale beam locking device detailed in Fig. 12, before contacts 616, 618 are closed by the arm 516, Fig. 4, to initiate the operation of the counterweight adjusting device.

Provision is made for locking the testing scale beam 601 and, as shown in Fig. 10, the scale beam 601 is rigidly held in a neutral position during the movement of the receptacle onto and off the scale pan and is released in proper timed relation for check weighing. Referring now to Figs. 2 and 12, an arm 650 provided with a set screw 652 in the end thereof, is pivotally mounted on a stud 654 which is mounted in a bracket 655. A gear segment 656 formed on the arm 650 meshes with a gear segment 658 formed on an arm 660 which is pivotally mounted on a stud 662 in the bracket 655. The arm 660 is also provided with a set screw 664. As illustrated in Fig. 2, provision is made for effecting the movement of the arms 660 and 650 to lock and unlock the scale beam 601 through connections including a link 666, a bell crank 668 and a link 672. The link 672 is connected to the arm 178 previously referred to and thus it will be observed that when the arm 176 operates to lock the final weight scale beam C, the check-weight scale beam D is also locked in a neutral position.

Provision is made for stopping the machine when a predetermined limit of adjustment of the auxiliary counterweight, in either direction, is effected to prevent any damage to the mechanism, such as, jamming the counter-weight 500 or breaking the prongs 506, and for this purpose a limit switch is provided. A limit switch 700 is mounted on the machine frame directly beneath the counter-weight 500, see Fig. 4, and is so arranged that when the counter-weight has been adjusted to a predetermined limit either of a pair of contact points 702 and 704, or 706 and 708, will be closed, depending on which direction the limit of adjustment has been reached. The closing of either of these contacts will complete a circuit, see Fig. 21, to energize an electromagnet 710. Referring now to Figs. 16, 17, and 18, the electromagnet 710 is mounted on the machine frame and is arranged to hold the pawl stop 258 in alignment with the pawl 80 of the pawl and ratchet clutch 40 when the limit of adjustment has been made. The same pawl stop 258 as previously referred to in connection with the safety device to stop the machine when the supply of cartons on the inlet conveyor was exhausted is used and, as shown in Fig. 18, an arm 712 fast on the pawl stop shaft 252 is arranged to be engaged by a latch 714 and held in this position to prevent removal of the pawl stop when the electromagnet 710 is energized. The latch is formed on the end of one arm 716 of a bell crank which is loosely mounted on a stud 718 fixed in the bracket 256. The second arm 720 of the bell crank carries a pin 722 which is adapted to be engaged by the underside of a lever 724 also loosely mounted on the stud 718. The outer end of the lever 724 is attached to an armature 726 of the electromagnet 710. The bell crank is also provided with a weight 728 attached to the hub thereof and which tends to overbalance the bell crank when it is free to rock. Normally the latch 714 is held out of the path of the arm 712 by the lever 724. When the electromagnet is energized, the armature will be forced upward and consequently the bell crank will be free to rock so that the latch 714 will engage the arm 712.

From the description thus far it will be observed that the present weighing machine functions to preserve a high degree of accuracy in the weighing at all times in an automatic, economical and practical manner.

While the preferred embodiment of the invention has been herein illustrated and described, it will be understood that the invention may be embodied in other forms within the scope of the following claims.

Having thus described the invention, what is claimed is:—

1. In a weighing machine, in combination, a weighing scale having a counterweight, means for feeding the material to be weighed onto the scale, means for testing the weight of loads weighed by the scale, and mechanism controlled by said testing means for varying the effective counter-weight upon the scale for the purpose specified.

2. In a weighing machine, in combination, a weighing scale having a counterweight, material feeding means controlled by said scale to form a weighed load, a testing scale, means for automatically transferring the weighed load from the weighing scale to the testing scale, mechanism controlled by the testing scale for increasing or decreasing the effective counter-weight on the weighing scale accordingly as the tested load is found to vary from a predetermined weight.

3. In a weighing machine, in combination, a weighing scale having a counterweight, a testing scale, package moving means capable of moving successive packages onto the weighing scale and thence onto the testing scale, material feeding means, and means controlled by said testing scale for automatically correcting the effective counter-weight upon the weighing scale in accordance with variations of the successively weighed loads from a predetermined weight.

4. In a weighing machine, in combination, a weighing scale provided with a counterweight and an auxiliary counterweight, material feeding means controlled by said scale for feeding material onto said scale to form weighed loads, a testing scale for testing the weight of said weighed loads, and means controlled by said testing scale for shifting the position of said auxiliary counterweight upon said scale.

5. In a weighing machine, in combination, weighing mechanism, testing mechanism for testing the weight of a load weighed by the weighing mechanism to determine whether or not the weighed load varies from a standard load, and means rendered operative by said testing mechanism when a variance is found to exist for controlling the operation of the weighing mechanism.

6. In a weighing machine for forming succeeding weighed loads, in combination, weighing mechanism, material feeding means controlled by said weighing mechanism, testing mechanism for testing the weight of a load weighed by the weighing mechanism to determine whether a weighed load varies from a standard load, and means rendered operative by said testing mechanism when a variance is found to exist for automatically varying the operation of the weighing mechanism upon succeeding loads until a tested load conforms to the standard load.

7. In a weighing machine, in combination, weighing mechanism including a scale having a counter-weight, means for testing the weight of a weighed load, and means controlled by said testing means for increasing or decreasing by a small increment the effective counter-weight upon said scale for the purpose specified.

8. In a weighing machine, in combination, weighing mechanism including a scale having a counter-weight and a small auxiliary counter-weight, testing mechanism for testing weighed loads, and means controlled by said testing mechanism for moving the auxiliary counterweight in opposite directions upon said scale accordingly as the tested load varies above or below a predetermined weight.

9. In a weighing machine, in combination, weighing mechanism including a scale having a counter-weight and a small auxiliary counter-weight, testing mechanism for testing weighed loads, and means controlled by said testing mechanism for moving the auxiliary counter-weight through a definite and small increment upon said scale and in opposite directions accordingly as the tested load varies from a predetermined weight.

10. In a weighing machine, in combination, weighing mechanism including a scale, testing mechanism for testing the weight of a load weighed by said scale, and means responsive to said testing mechanism for modifying the operation of the weighing mechanism in accordance with the weight of a tested load.

11. In a weighing machine, in combination, weighing mechanism including a scale, material feeding means controlled by said scale for feeding material into said scale to form weighed loads, testing mechanism comprising a scale for testing the weight of said weighed loads, an over-weight and an under-weight contact operable by said testing mechanism, means rendered operative by the actuation of either contact for modifying the operation of the weighing mechanism.

12. In a weighing machine, in combination, a weighing mechanism including a load balancing means, a testing means for testing the weight of a load weighed by said weighing mechanism, and means controlled by said testing means for adjusting said balancing means.

13. A weighing machine comprising a weighing mechanism including a weighing scale, material feeding means for feeding material onto said scale, and means controlled by said scale for interrupting said feeding means to form weighed loads, an auxiliary scale for testing the weight of a weighed load, means for transforming said load from said weighing scale to said auxiliary scale, and means controlled by said auxiliary scale for adjusting said weighing mechanism to maintain said loads at a predetermined weight.

WILLIAM S. CLEAVES.